United States Patent [19]
Jaster et al.

[11] Patent Number: 5,655,379
[45] Date of Patent: Aug. 12, 1997

[54] REFRIGERANT LEVEL CONTROL IN A REFRIGERATION SYSTEM

[75] Inventors: Heinz Jaster, Schenectady; Frank Joseph Bowden, Latham, both of N.Y.

[73] Assignee: General Electric Company, Schenectady, N.Y.

[21] Appl. No.: 549,501

[22] Filed: Oct. 27, 1995

[51] Int. Cl.$^6$ ............................... F25B 41/00; F16K 21/18
[52] U.S. Cl. ............................... 62/210; 62/218; 137/392; 251/129.05
[58] Field of Search ............................... 62/218, 210, 222, 62/188; 137/392; 236/75; 251/129.05, 129.08

[56] References Cited

U.S. PATENT DOCUMENTS

| | | | |
|---|---|---|---|
| 4,404,809 | 9/1983 | Joshnson et al. | 137/392 X |
| 4,515,008 | 5/1985 | Bessler | 62/212 |
| 5,094,086 | 3/1992 | Shyu | 62/218 |
| 5,425,246 | 6/1995 | Bessler | 62/211 |
| 5,426,952 | 6/1995 | Bessler | 62/211 |
| 5,431,026 | 7/1995 | Jaster | 62/221 |
| 5,435,145 | 7/1995 | Jaster | 62/218 X |
| 5,463,876 | 11/1995 | Bessler et al. | 62/223 |

OTHER PUBLICATIONS

Pending U.S. Patent Application Serial No. 08/222,051 filed Apr. 4, 1994, by Bessler, entitled "Control System For Refrigerant Metering Solenoid Valve".

*Primary Examiner*—William E. Wayner
*Attorney, Agent, or Firm*—Patrick K. Patnode; Donald S. Ingraham

[57] ABSTRACT

A refrigeration system includes a phase separator disposed in flow communication with a pulse width modulated solenoid valve. A thermistor is disposed in the phase separator and is submerged in either refrigerant liquid or refrigerant vapor during operation, with the electrical resistance thereof correspondingly changing. In an exemplary embodiment, a second thermistor is used in conjunction with the first thermistor and is disposed in the vapor inside the phase separator to provide a reference. By comparing voltage developed across the two thermistors during operation it may be determined whether one or both of the thermistors are submersed in the vapor. The duty cycle of the valve may therefore be increased when one of the thermistors is submerged in the liquid, and decreased when both thermistors are submersed in the vapor.

9 Claims, 2 Drawing Sheets

1

REFRIGERANT LEVEL CONTROL IN A REFRIGERATION SYSTEM

BACKGROUND OF THE INVENTION

The present invention relates generally to refrigeration systems, and, more specifically, to refrigerant level control in a phase separator contained therein.

A typical refrigeration system includes a compressor for compressing a normally gaseous refrigerant into high pressure gas disposed in serial flow communication with a condenser for removing heat therefrom and condensing the refrigerant to its liquid phase; an expansion device; and an evaporator located in a refrigerator housing for providing cooling therein in a conventional manner. The refrigeration system may operate on a simple one stage vapor compression cycle or may operate in a more complex cycle such as a dual evaporator two stage cycle.

In the two stage cycle, a pair of compressor stages are disposed in turn upstream of the condenser, and a pair of evaporators are disposed in turn downstream of the condenser. A separate expansion device is disposed upstream of each of the evaporators, and a phase separator is disposed between the first evaporator and the second expansion device. The phase separator is a relatively simple vessel which effects phase separation by gravity, with the refrigerant liquid filling the bottom portion of the vessel, and refrigerant vapor filling the upper portion of the vessel. And, the level of the liquid varies during operation and is acceptable over a wide range of levels as long as two phase refrigerant is maintained in the separator vessel.

The vessel has an inlet at its top for receiving the refrigerant from the first evaporator and an outlet at its bottom for channeling the liquid to the second expansion device. The separator also has a second outlet positioned at a suitable vertical elevation above the normal range of liquid level in the vessel which is disposed in flow communication between the two compressor stages for returning a portion of the vapor for undergoing compression in the second stage.

Typical expansion devices are relatively simple capillary tubes which have known limitations. An improved expansion device is a conventional electrical solenoid valve which is suitably controlled by a pulse width modulated signal between a fully open position and a fully closed position, with the valve typically being a normally closed valve when unenergized. Pulse width modulation is conventionally accomplished using a specific frequency in the exemplary range of about 0.1-2 Hz, with the average flowrate through the valve being controlled by the duty cycle of the pulse width modulation which is simply the duration or length of each pulse per cycle for which the valve is open.

Various pulse width modulation control systems are known for controlling operation of the refrigeration system based on various parameters such as superheat, dryness, and subcooling in various components of the system which in turn may be determined by measuring various temperatures in the system or the liquid level in the phase separator. It is known to control pulse width modulation by measuring liquid level in the phase separator using one or two level sensor switches therein. However, it is desirable to sense the phase separator liquid level in a simple and inexpensive manner for keeping the cost of the refrigeration system correspondingly low while obtaining a suitable useful life and effective pulse width modulation.

SUMMARY OF THE INVENTION

A refrigeration system includes a phase separator disposed in flow communication with a pulse width modulated solenoid valve. A thermistor is disposed in the phase separator and is submerged in either refrigerant liquid or refrigerant vapor during operation, with the electrical resistance thereof correspondingly changing. In an exemplary embodiment, a second thermistor is used in conjunction with the first thermistor and is disposed in the vapor inside the phase separator to provide a reference. By comparing voltage developed across the two thermistors during operation it may be determined whether one or both of the thermistors are submersed in the vapor. The duty cycle of the valve may therefore be increased when one of the thermistors is submersed in the liquid, and decreased when both thermistors are submerged in the vapor.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
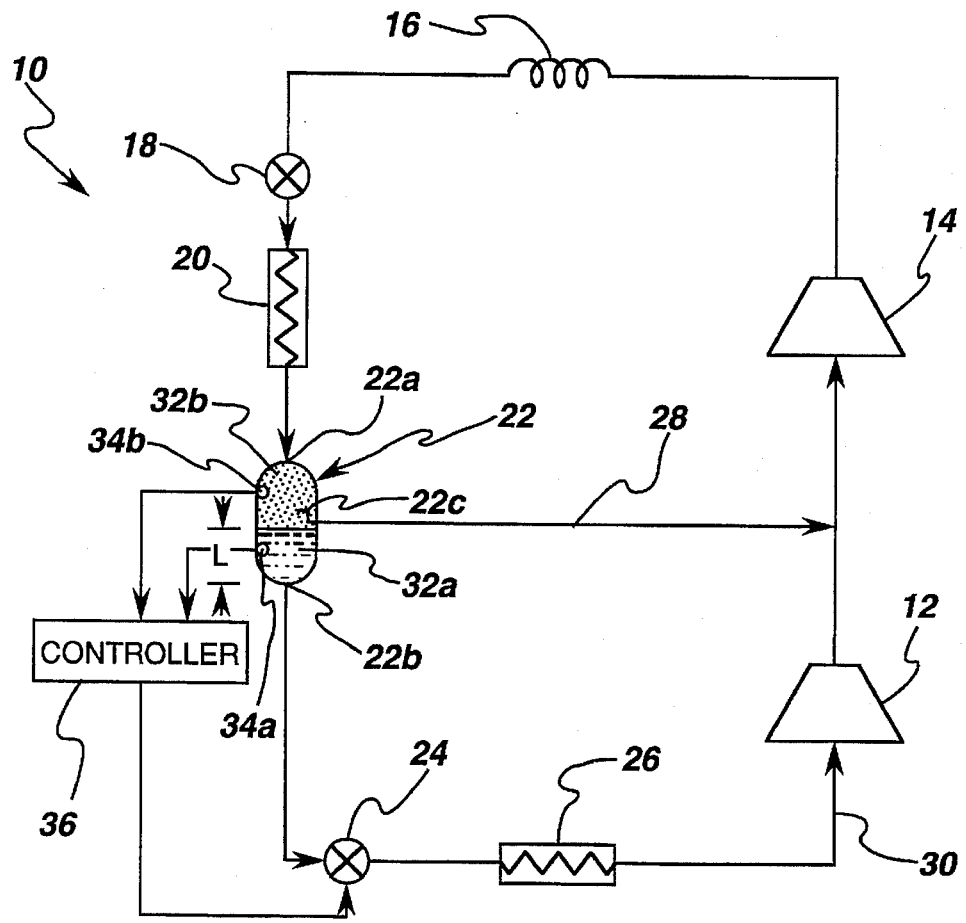
FIG. 1 is a schematic representation of an exemplary dual evaporator two stage refrigeration system having a phase separator and a controller for effecting pulse width modulation of an expansion device disposed in flow communication with the phase separator in accordance with one embodiment of the present invention.

Illustrated schematically in FIG. 1 is a refrigeration system 10 in accordance with an exemplary embodiment which implements a dual evaporator two stage refrigeration cycle. The system 10 includes in serial flow communication a first compressor 12, a second compressor 14, a condenser 16, a first expansion device 18, a first evaporator 20, a phase separator 22, a second expansion device 24, and a second evaporator 26 all connected in a closed loop. The first and second compressors 12,14 are in the exemplary form of a two-stage compressor driven by a common motor. The system is charged with a suitable refrigerant which is compressed in the compressors 12, 14. The compressed refrigerant is then discharged to the condenser 16 where it is cooled and condensed. The refrigerant flows through the first expansion device 18 for undergoing expansion and is channeled into the first evaporator 20 which is disposed within the fresh food compartment of a typical refrigerator for cooling food therein.

Two phase refrigerant is discharged from the first evaporator 20 to the phase separator 22. The separator 22 comprises a closed receptacle or vessel having a top inlet 22a for receiving the two phase refrigerant, a first or bottom outlet 22b for providing liquid refrigerant to the second expansion device 24, and a second or side outlet 22c disposed in flow communication with a suction line 28 which is connected to the inlet of the second compressor 14 downstream of the first compressor 12.

The liquid refrigerant provided to the second expansion device 24 is expanded therein and then flows to the second evaporator 26 which is disposed within the freezer compartment of the refrigerator for the cooling thereof. The refrigerant exits the second evaporator 26 in a superheated gaseous state and flows through a suction line 30 for return to the first compressor 12 for repeating the cycle.

The first expansion device 18 may take any suitable form such as a capillary tube, or a pulse width modulated (PWM) solenoid valve suitably controlled. The second expansion device 24 in the preferred embodiment is a pulse width modulated (PWM) solenoid valve having an adjustable duty cycle for controlling refrigerant flowrate therethrough. But for the present invention as described below, the refrigeration system 10 is conventional in structure and function. In accordance with the present invention, it is desirable to control the duty cycle of the solenoid valve 24 based on liquid level in the phase separator 22.

More specifically, during normal operation of the system 10, the refrigerant exists in the phase separator 22 at a single temperature in both its liquid and vapor phase. The refrigerant liquid is designated 32a and fills the bottom portion of the separator 22 to an elevation or level L, with the upper portion of the separator 22 containing refrigerant vapor designated 32b. The liquid level L varies during operation of the system 10 and is acceptable as long as two phase refrigerant is maintained in the separator 22, and the second outlet 22c receives only refrigerant vapor.

The liquid level L is controlled by adjusting the duty cycle of the solenoid valve 24 for increasing the flowrate through the valve 24 to decrease the level L and decreasing the flowrate through the valve 24 for increasing the level L. In accordance with one embodiment of the present invention, liquid level sensor means in the exemplary form of a pair of first and second thermistors 34a and 34b are disposed in the phase separator 22 for changing electrical resistance in response to change in the liquid level L to thereby sense the liquid level L. An electrical controller 36 is suitably operatively joined to each of the thermistors 34a, 34b for receiving input signals therefrom, and is also operatively joined to the PWM valve 24 for outputting a control signal thereto for correspondingly varying the duty cycle of the valve 24 in response to the sensed liquid level L in the phase separator 22. The controller 36 is effective for increasing the duty cycle of the valve 24 upon a sensed increased in the liquid level L, and decreasing the duty cycle of the valve 24 upon a sensed decrease in the liquid level L.

Figure 2:
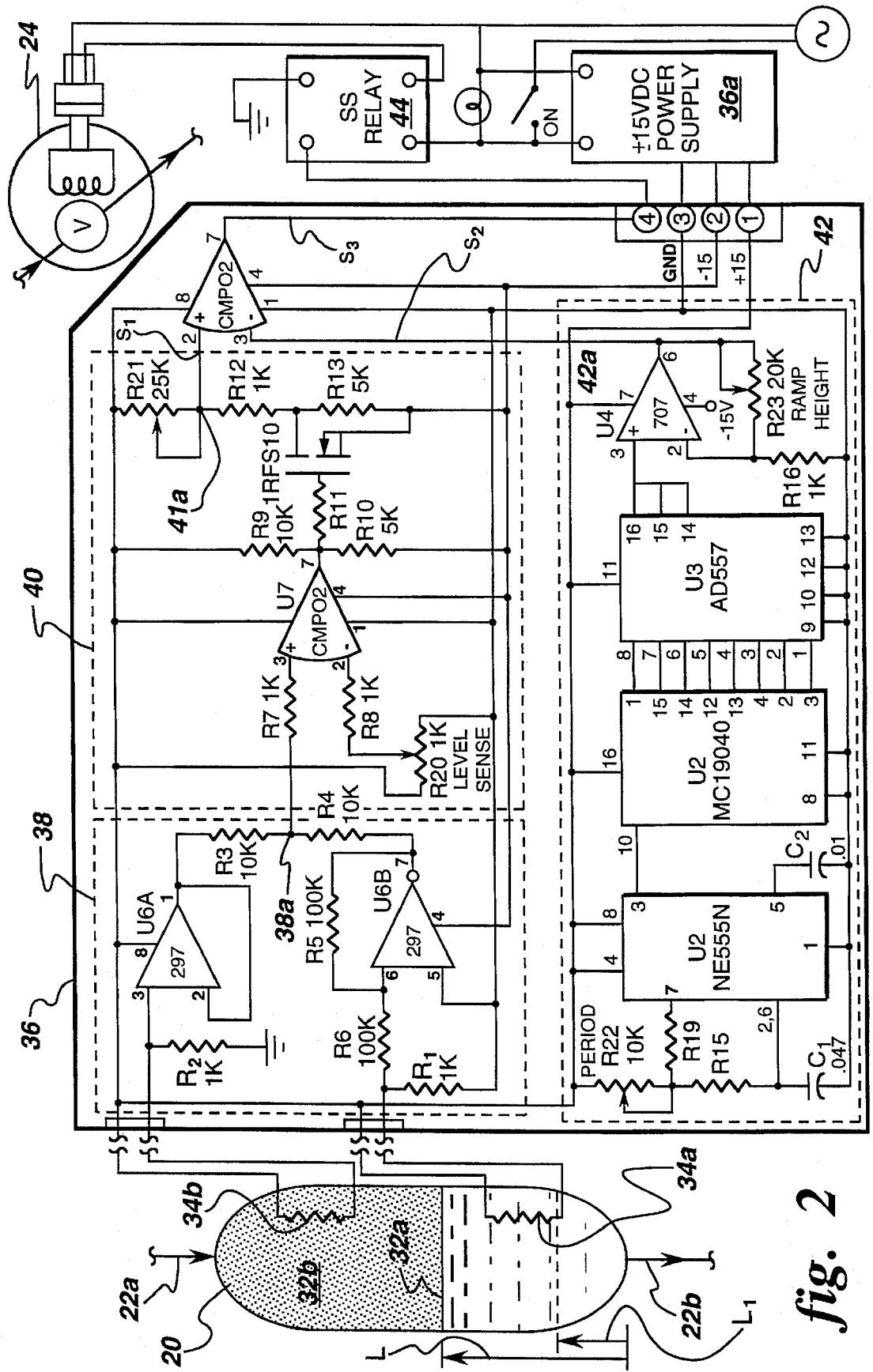
FIG. 2 is a schematic representation of the phase separator illustrated in FIG. 1 having a pair of thermistors disposed therein for sensing liquid level, with the thermistors being joined to the controller having an exemplary circuit for varying the duty cycle of the solenoid valve in response to liquid level.

The phase separator 22, thermistor 34a, 34b, controller 36, and PWM valve 24 are illustrated schematically in more particularity in FIG. 2 in accordance with an exemplary embodiment of the present invention. The thermistors 34a,b may take any conventional form such as an NTC thermistor type T60B103M manufactured by the Thermionics Company. For a given thermistor, a given electrical current, and a given temperature of the fluid which surrounds the thermistor, the thermistor temperature and therefore its electrical resistance depend only on the convective heat transfer coefficient between the thermistor and its surrounding fluid. The greater the heat transfer coefficient, the lower is the thermistor temperature and the greater its electrical resistance. It is generally true that convection heat transfer coefficients are greater in a liquid than in a vapor at about equal flow velocities because liquid has greater density and thermal conductivity.

In accordance with the present invention, the two thermistors 34a,b are suitably disposed in the phase separator 32 which contains both the refrigerant liquid 32a and vapor 32b. The first thermistor 34a (which are inexpensive devices) is disposed in a lower portion of the separator 22 for being alternatively submerged in the refrigerant liquid 32a or in the refrigerant vapor 32b as the liquid level L varies during operation. The second thermistor 34b is disposed in an upper portion of the separator 22 for being submerged only in the refrigerant vapor 32b during operation. The second thermistor 34b provides a reference for the first thermistor 34b since refrigerant temperature changes during operation. Accordingly the first and second thermistors 34a,b are preferably substantially identical to each other in the preferred embodiment.

Since the first thermistor 34a is normally submerged in the liquid 32a, the resistive heat generated during operation is dissipated at a greater heat transfer coefficient in the liquid 32a as compared to heat dissipation from the second thermistor 32b into the vapor 32b. The first thermistor 34a will therefore operate at a lower temperature than that of the second thermistor 34b, with the first thermistor 34a having a greater electrical resistance than that of the second thermistor 34b.

When the liquid level L drops to a low value $L_1$ below the first thermistor 34a, as illustrated in dashed line in FIG. 2, both the first and second thermistors 34a,b are disposed in the refrigerant vapor 32b and therefore experience the same heat transfer thereto and will therefore operate at substantially the same temperature and electrical resistance. Accordingly, the change in liquid level L in the phase separator 22 below and above the first thermistor 34a may therefore be sensed by sensing the change in the electrical resistance in the first thermistor 34a. In response to this sensed change in electrical resistance, the duty cycle of the valve 24 may be correspondingly varied to maintain the liquid level L above the elevation of the first thermistor 34a.

In order to measure change in the electrical resistance of the first thermistor 34a illustrated in FIG. 2, first means 38 are operatively joined to the first and second thermistors 34a,b for producing a voltage change signal indicative of the sensed change in electrical resistance. The controller 36 illustrated in FIG. 2 is provided with a suitable power supply 36a providing plus and minus 15 volts DC from AC line voltage. The power supply 36a generates an electrical current through the pair of thermistors 34a,b which are separately in turn joined to respective voltage dividers provided by first and second resistors R1 and R2 which in turn are operatively joined to a pair of conventional unity gain amplifiers U6A and U6B. The voltage developed by the first thermistor 34a and its cooperating first resistor R1 is sent to the first amplifier U6A, and the voltage developed by the second thermistor 34b and its cooperating second resistor R2 is sent to the second amplifier U6B.

The output of the first amplifier U6A is inverted relative to the output of the second amplifier U6B, with each amplifier being in turn operatively joined in series with respective resistors R3 and R4 which form a junction 38a to develop the voltage change signal. The individual components of the first means 38 are conventional, with additional resistors being illustrated in FIG. 2 for conventionally completing the circuit thereof for effective operation.

When the first and second thermistors 34a,b are at the same temperature with both being disposed in the vapor 32b, the outputs of the amplifiers U6A and U6B will be equal in magnitude but opposite in polarity. Under this condition, the junction 38a will be at approximately zero volts. When the first thermistor 34a senses liquid by being submerged therein, its resistance will increase, which in turn will lower the input voltage to the first amplifier U6A, and which in turn lowers its negative output voltage causing the voltage at the junction 38a to rise. Accordingly, the voltage change signal developed at the junction 38a will have a relatively low or zero value when both thermistors 34a,b are submerged in the vapor 32b, and will have a higher or non-zero value, relative to the low value, when the first thermistor 34a is submerged in the liquid 32a and the second thermistor 34b is submerged in the vapor 32b. In this way, the voltage developed across the two thermistors 34a,b may be compared to determine whether one or both of the thermistors are submerged in the vapor.

Second means 40 are operatively joined to the first means 38 for producing a liquid level voltage signal $S_1$ indicative of the liquid level L. In the exemplary embodiment illustrated in FIG. 2, the second means 40 comprise a variable resistor R20 for setting a threshold liquid level sensed voltage, with a first comparator U7 being operatively joined to the variable resistor R20 and the change signal junction 38a in a conventional manner using the additional resistors shown. A voltage divider network R12, R13, R21 is also provided for producing the liquid level voltage signal, with a suitable field effect transistor Q1 being operatively joined between the first comparator U7 and the voltage divider network using additional resistors illustrated in a conventional arrangement.

The first comparator U7 is effective for activating the transistor Q1 to an open or off condition to produce a relatively high liquid level voltage signal at a corresponding output junction 40a in the voltage divider network when the high change signal from the junction 38a exceeds a threshold voltage preselected by the variable resistor R20. The first comparator U7 is also effective for activating the transistor Q1 closed or on to produce a low liquid level voltage signal at the junction 40a relative to the high signal thereat when the change signal at the junction 38a does not exceed the threshold voltage set by the variable resistor R20. The resistor R20 is initially preselected so that the first comparator U7 properly activates the transistor Q1 in its two states corresponding to the first thermistor 34a being submerged in the liquid 32a, and when the first thermistor 34a is disposed in the vapor 32b when the liquid level L drops suitably low. The second means 40 includes conventional individual components, and utilizes additional resistors as illustrated in FIG. 2 arranged in a conventional manner for obtaining the desired operation in accordance with the present invention.

Figure 3:
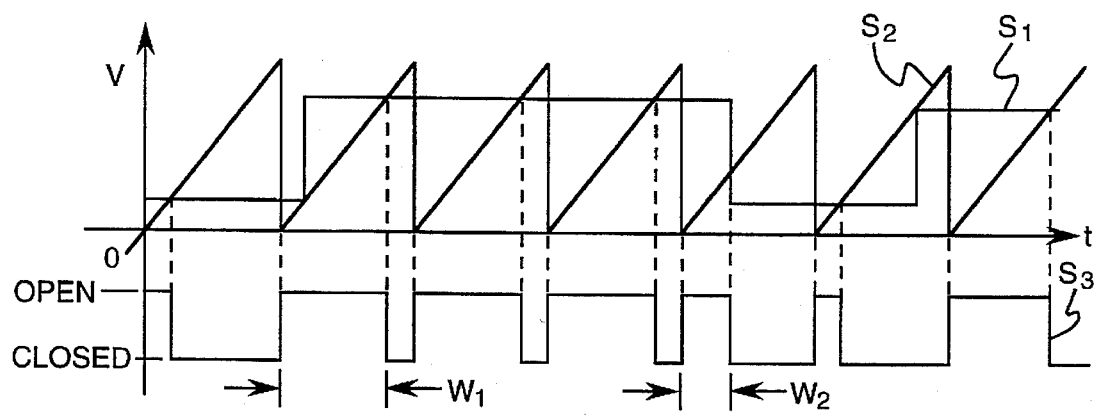
FIG. 3 is a graph illustrating an exemplary ramp signal and cooperating liquid level signal for effecting a pulse width modulated control signal therefrom for controlling the duty cycle of the solenoid valve.

The first and second means 38 and 40 utilize the electrical resistance change in the first thermistor 34a relative to the second thermistor 34b to produce the liquid level signal $S_1$ at the output junction 40a. The liquid level signal $S_1$ is shown in an exemplary form in FIG. 3 as being a step wave varying in magnitude from suitably high to suitably low positive voltage values for example. As shown in FIG. 3, the liquid level signal $S_1$ is combined with a suitable periodic ramp signal $S_2$ to create a corresponding pulse width modulation control signal $S_3$. The ramp signal $S_2$ has a suitable ramp height extending from zero volts to a suitable maximum voltage, and has a suitable period corresponding to a frequency ranging from about 0.1–2 Hz. The separate signals $S_1$ and $S_2$ are conventionally combined to generate the PWM control signal $S_3$ which is used as a control signal for periodically opening and closing the solenoid valve 24. As shown in FIG. 3, the high values of the liquid level signal $S_1$ cause the control signal $S_3$ to have a relatively long or maximum pulse $W_1$ to increase the duty cycle of the valve 24, with the low values of the signal $S_2$ resulting in a relatively short pulse width $W_2$ to decrease the duty cycle.

As illustrated in FIG. 2, third means 42 are provided in the controller 36 for generating the periodic ramp signal $S_2$ and are generally conventional. The third means 42, or simply ramp generator 42, includes a ramp oscillator U1, counter U2, digital-to-analog converter U3 and an operational amplifier U4 operatively joined together in a conventional manner. The ramp generator 42 is suitably powered by the power supply 36a and has an output junction 42a disposed after the amplifier U4. The ramp generator 42 includes a variable resistor R22 operatively joined to the oscillator U1 for selectively adjusting the ramp period or frequency, and a variable resistor R23 is operatively joined to the amplifier U4 and the output junction 42a for setting the ramp height. The resulting ramp signal $S_2$ varies from zero to ten volts at a frequency of about 0.5 Hz in an exemplary embodiment.

Pulse width modulation is effected by fourth means in the exemplary form of a conventional comparator U5 having its negative input operatively joined to the ramp generator output junction 42a and its positive input operatively joined to the output junction 40a of the second means 40. The comparator U5 therefore receives the level signal $S_1$ from the output junction 40a, and the ramp signal $S_2$ from the output junction 42a. The comparator U5 produces the pulse width modulated control signal $S_3$ having a long or first pulse width $W_1$ to increase the duty cycle of the solenoid 24, and a short or second pulse width $W_2$, which is less than the first width $W_1$, to decrease the duty cycle. The comparator U5 is operatively joined to the solenoid valve 24 using a conventional solid state relay 44 in an exemplary embodiment for controlling refrigerant flowrate through the valve 24. In this embodiment, the valve 24 is an AC voltage powered valve. In an alternate embodiment, the relay 44 may be replaced by a suitable field effect transistor switch cooperating with a DC operated solenoid valve 24 powered by the same power supply 36a.

The smaller pulse width $W_1$ is determined by the ratio of resistors R21 and R12 in the voltage divider network in the second means 40, with the larger pulse width $W_1$ being determined by the ratio of resistor R21 and the sum of the resistors R12 and R13. Both pulse width levels can be varied from their nominal values of on time by simply adjusting the variable resistor R21. In an exemplary embodiment, the long pulse width $W_1$ represents 75% of the on time per cycle and the small pulse width $W_2$ represents 15% of the on time per cycle.

As indicated above, when the first thermistor 34a is submerged in the liquid 32a indicating high liquid level, the first comparator U7 will send its output voltage to zero causing the transistor Q1 to open, which in turn causes the voltage of the liquid level signal $S_1$ at the output junction 40a, and the positive input of the second comparator U5, to a correspondingly high level. The control signal $S_3$ correspondingly has the long pulses of width $W_1$ for increasing the duty cycle of the solenoid valve 24 and therefore decreasing the liquid level L of the refrigerant liquid 32a in the phase separator 22. As the phase separator 22 empties out and the liquid level drops below the first thermistor 34a, the process reverses. When both thermistors 34a,b are in the refrigerant vapor 32b, the voltage at the junction 38a approaches zero and is below the threshold value set by the variable resistor R20. The first comparator U7 will then switch its output state high causing the transistor Q1 to close and turn on, and therefore bypassing the resistor R13 to ground, resulting in a lower voltage at the output junction 40a and at the positive input to the second comparator U5. The output of the second comparator U5 decreases to the short pulse $W_2$ which correspondingly decreases the duty cycle of the solenoid valve 24 for allowing the liquid level in the phase separator 22 to rise in turn.

The thermistors 34a,b and the circuits defined in the controller 36 are relatively inexpensive components which decrease the overall cost of the refrigeration system 10, yet provides effective liquid level control in the phase separator 22. Because the nature of the difference signal between the first and second thermistors 34a,b at the output junction 38a is dynamic, the controller 36 may be suitably modified to also include a conventional sample and hold circuit to synchronize the signal at the output junction 38a to the start of each ramp cycle if desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention. Although the typical thermistor is disclosed herein, other types of resistance devices such as an inverse gradient thermistor could also be used with suitable changes in the control circuit.

Accordingly, what is desired to be secured by Letters patent of the United States is the invention as defined and differentiated in the following claims:

We claim:

1. A refrigeration system having refrigerant level control capabilities comprising:

an evaporator;

a phase separator coupled to said evaporator via a conduit, said phase separator having an upper portion and a lower portion for containing a refrigerant in two phases, a liquid refrigerant disposed at a variable level therein and a vapor refrigerant disposed above said liquid level;

a control valve disposed in said conduit so as to control flow of said liquid refrigerant therethrough;

a first temperature sensor disposed in said upper portion of said phase separator for exposure to said vapor refrigerant;

a second temperature sensor disposed in said lower portion of said phase separator for alternative exposure to either said liquid refrigerant or vapor refrigerant as said liquid level varies;

a controller coupled to said control valve, to said first temperature sensor, and to said second temperature sensor wherein said controller senses a relative change in temperature between said first and second temperature sensors and, responsive to the sensed relative change said controller generates a control signal to said control valve to vary the duty cycle of said control valve; and said controller being adapted to generate said control signal to said control valve so as to decrease the duty cycle of said valve when said sensed relative change in temperature between said first and second temperature sensors is approximately zero and so as to increase the duty cycle of said valve when said sensed relative change in temperature between said first and second temperature sensors is relatively large compared to said value that is approximately zero.

2. A refrigeration system, in accordance with claim 1, wherein said controller comprises:

a first amplifier coupled to said first temperature sensor adapted to receive voltage developed by said first temperature sensor;

a second amplifier of opposite voltage than said first amplifier coupled to said second temperature sensor adapted to receive voltage developed by said second temperature sensor;

a first resistor and a second resistor coupled together and to said first and second amplifier so as to form a first junction to develop a voltage change signal indicative of relative voltage between first temperature sensor and second temperature sensor;

a variable resistor coupled to said first junction for setting a threshold relative voltage indicative of liquid level;

a voltage divider network having an output junction for producing a liquid level signal;

a first comparator coupled to said variable resistor and said first junction:

a transistor coupled to said first comparator and said voltage divider;

said first comparator being adapted to activate said transistor to an open or off condition to produce a relatively high liquid level voltage signal at said output junction when a high change signal from said first junction exceeds said threshold relative voltage set by said variable resistor, said first comparator further being adapted to activate said transistor to a closed or on condition to produce a low liquid level voltage signal at said output junction relative to said high liquid level voltage signal when said change signal from said first junction is less than said threshold voltage set by said variable resistor;

a ramp generator for producing a periodic ramp signal;

a second comparator coupled to said ramp generator and said output junction for receiving said level signal from said output junction and said ramp signal from said ramp generator wherein said second comparator produces a pulse width modulated control signal to said control valve having a long or first pulse width to increase said duty cycle of said control valve and a short or second modulated control signal to said control valve having a pulse width which is less than said first pulse width to decrease the duty cycle of said control valve.

3. A refrigeration system comprising:

a compressor, a condenser, a phase separator, a pulse width modulated solenoid valve, and an evaporator disposed in serial flow communication in a closed loop for circulating a refrigerant therethrough;

said phase separator including said refrigerant in two phases, with refrigerant liquid being disposed at a variable level therein, and refrigerant vapor being disposed above said liquid level;

a first thermistor disposed in a lower portion of said phase separator for being submerged in said liquid or vapor as said liquid level varies;

a reference second thermistor disposed in an upper portion of said phase separator for being submerged in said vapor;

a controller operatively coupled to said valve and said first and said second thermistors, and being effective for increasing duty cycle of said valve upon sensed increase in said liquid level, and decreasing said duty cycle upon sensed decrease in said liquid level;

a first means operatively coupled to said first and second thermistors for measuring said change in electrical resistance and producing a change signal indicative thereof;

a second means operatively joined to said first means for producing a liquid level signal indicative of said liquid level;

third means for generating a periodic ramp signal; and fourth means operatively coupled to said second and third means for receiving said level and ramp signal, and being effective for producing a pulse width modulated control signal having a long pulse to increase said duty cycle, and a short pulse relative to said long pulse to decrease said duty cycle, and said fourth means being operatively joined to said valve for controlling refrigerant flowrate therethrough; and said first means is operatively coupled to both said first and second thermistors so that said change signal has a low value when both said first and second thermistors are submerged in said vapor, and a high value relative to said low value when said first thermistor is submerged in said liquid and said second thermistor is submerged in said vapor.

4. A system according to claim 3 wherein:

said first and second thermistors are substantially identical; and said first means comprise a pair of unity gain amplifiers respectively joined to said first and second thermistors in opposite voltage polarity, and a pair of resistors forming a junction to develop said change signal, and joined in series with respective ones of said amplifiers.

5. A system according to claim 4 wherein said second means comprise:

a variable resistor for setting a threshold liquid level voltage;

a first comparator operatively joined to said variable resistor and said change signal junction;

a voltage divider network for producing said liquid level signal;

a transistor operatively joined between said first comparator and said voltage divider network; and said first comparator being effective for activating said transistor to produce a high liquid level signal when said high change signal exceeds said threshold value, and to produce a low liquid level signal relative to said high signal thereof when said change signal does not exceed said threshold voltage.

6. A system according to claim 5 wherein said third means are effective to selectively vary ramp height and period of said ramp signal.

7. A system according to claim 6 wherein said fourth means comprise a second comparator.

8. A system according to claim 7 wherein said voltage divider network is adjustable to control width of both said long and short pulses from said second comparator.

9. A system according to claim 8 further comprising first and second compressors and first and second evaporators disposed in said closed loop to form a dual evaporator two stage refrigeration cycle, with a first expansion device being disposed between said condenser and said phase separator, and with said valve being disposed between said phase separator and said second evaporator.

* * * * *